(12) United States Patent  
Fedeli

(10) Patent No.: US 6,600,250 B1
(45) Date of Patent: Jul. 29, 2003

(54) MACHINE TOOL

(75) Inventor: Giancarlo Fedeli, Foligno (IT)

(73) Assignee: Gifam S.r.l., Foligno (IT)

(*) Notice: Subject to any disclaimer, the term of this patent is extended or adjusted under 35 U.S.C. 154(b) by 0 days.

(21) Appl. No.: 09/718,791

(22) Filed: Nov. 22, 2000

(30) Foreign Application Priority Data

Nov. 23, 1999 (IT) ........................ TO99A1025

(51) Int. Cl.[7] .................. H02K 16/00; B23C 1/08
(52) U.S. Cl. .................. 310/114; 310/112; 409/231; 409/191
(58) Field of Search .................. 409/200, 199, 409/216, 231; 310/112, 114, 115

(56) References Cited

U.S. PATENT DOCUMENTS

| 2,289,111 A | | 7/1942 | Fett |
| 2,870,578 A | * | 1/1959 | Baier .................. 409/200 |
| 3,808,944 A | * | 5/1974 | Braginetz .................. 409/199 |
| 4,014,439 A | | 3/1977 | Kochsiek et al. |
| 4,365,916 A | | 12/1982 | Miyakawa |
| 4,749,898 A | | 6/1988 | Suzuki et al. |
| 5,309,800 A | | 5/1994 | Yuhara |
| 5,350,263 A | * | 9/1994 | Fedeli .................. 409/231 |
| 5,575,176 A | | 11/1996 | Rohrs et al. |
| 5,699,598 A | * | 12/1997 | Hessbrueggen et al. .... 409/200 |
| 5,980,172 A | * | 11/1999 | Shoda .................. 409/203 |

FOREIGN PATENT DOCUMENTS

| DE | 2616550 A | 10/1977 |
| DE | 4335765 A | 4/1995 |
| DE | 4410762 A | 10/1995 |
| DE | 19710325 A | 10/1997 |
| EP | 0033373 A | 8/1981 |
| EP | 0486992 A | 5/1992 |

* cited by examiner

Primary Examiner—Burton S. Mullins
(74) Attorney, Agent, or Firm—Zito tlp; Joseph J. Zito

(57) ABSTRACT

A machine (1) (42) wherein a frame (2) supports at least one operating head (34) (34a, 34b) via the interposition of an actuating device (4) for enabling the operating head (34) (34a, 34b) to move in relation to the frame (2) within a predetermined volume; and wherein the actuating device (4) is defined by two electric motors (14,24), the respective axes (6,21) of which are parallel to each other; and wherein a rotor (15) of one (14) of the two motors (14,24) is supported by the frame (2) and eccentrically supports a stator (23) of the other motor (24), a rotor (25) of which supports a straight guide member (31) in turn supporting a powered slide member (33) in turn supporting the operating head (34) (34a, 34b).

10 Claims, 4 Drawing Sheets

MACHINE TOOL

The present invention relates to a machine tool.

More specifically, the present invention relates to a machine tool of the type comprising a fixed supporting frame; a toolhead fitted movably to said frame and supporting a machining tool; and an actuating device for moving the tool along an approach and machining path with respect to the frame and with respect to at least three axes defining a travel volume for the tool.

BACKGROUND OF THE INVENTION

The actuating device of known machine tools of the above type normally comprises a first straight slideway along which runs a first powered slide supporting a second straight slideway, the projection of which on a plane forms an angle of other than zero with the projection of the first slideway on the same plane. The actuating device also comprises a second slide mounted to run along the second slideway and supporting a third slideway perpendicular to the first and second slideways and supporting a third powered slide in turn supporting the toolhead and the relevant tool.

Known machine tools of the above type have the drawback of being fairly bulky. That is, the length of each slideway is determined by the size of the relative slide in the direction of the slideway, plus the travel of the slide, plus the length of two telescopic guards located on opposite sides of the slide to protect the slideway, so that the linear size of the slideways and slides as a whole for moving the tool in the travel volume is at least twice the amount of travel permitted.

Moreover, the structure of the straight slideways is complicated by the presence of mechanical stops or bumpers for arresting the slides and preventing them from running off the slideways in the event of improper operation of the slides, and the strength of which is directly proportional to the travelling speed of the slides.

Finally, moving the tool in the travel volume using translating slides calls for moving the slides continually back and forth along the relative slideways, thus resulting in severe inertia, which severely impairs the accuracy of the machine tool unless provision is made for a fairly rigid, heavy frame, which is therefore also fairly bulky and expensive to produce, install and assemble.

SUMMARY OF THE INVENTION

It is an object of the present invention to provide a machine tool of the above type designed to eliminate at least in part the aforementioned drawbacks.

According to the present invention, there is provided a machine tool comprising a supporting frame; an operating unit fitted movably to said frame; and an actuating device for moving said operating unit with respect to said frame and parallel to a given plane; characterised in that said actuating device comprises a main electric motor in turn comprising a main stator integral with said frame, and a main rotor fitted to the main stator and rotating about a main axis with respect to the main stator; and at least one secondary electric motor in turn comprising a secondary stator integral with said main rotor, and a secondary rotor fitted to the secondary stator and rotating about a secondary axis movable with said main rotor; said main axis and said secondary axis being perpendicular to said plane, and being separated from each other by a first given distance of other than zero; said operating unit being supported eccentrically by said secondary rotor; and said first distance being less than a radius of the main rotor.

In a preferred embodiment, comprising a fixed worktable; a fixed supporting frame; at least one toolhead fitted movably to said frame; a tool mounted on said toolhead; and an actuating device for moving said tool with respect to said frame and said worktable along a machining path extending within a predetermined volume; said actuating device comprising a main electric motor in turn comprising a main stator integral with said frame, and a main rotor fitted to the main stator and rotating about a main axis, coaxial with said cylindrical volume, with respect to the main stator; at least one secondary electric motor in turn comprising a secondary stator integral with said main rotor, and a secondary rotor fitted to the secondary stator and rotating about a secondary axis movable with said main rotor; and at least a machining unit comprising straight guide means supported eccentrically by said secondary rotor, and powered slide means angularly fixed in relation to said straight guide means and movable therealong in a direction parallel to said main axis and said secondary axis; said toolhead being mounted on said powered slide means for rotation in relation thereto about a tertiary axis parallel to said main axis and said secondary axis, and each said axis being separated from each of the other axes by distances, each of which is less than a radius of the main rotor.

BRIEF DESCRIPTION OF THE DRAWINGS

A number of non-limiting embodiments of the invention will be described by way of example with reference to the accompanying drawings, in which.

DETAILED DESCRIPTION OF THE INVENTION

Figure 1:
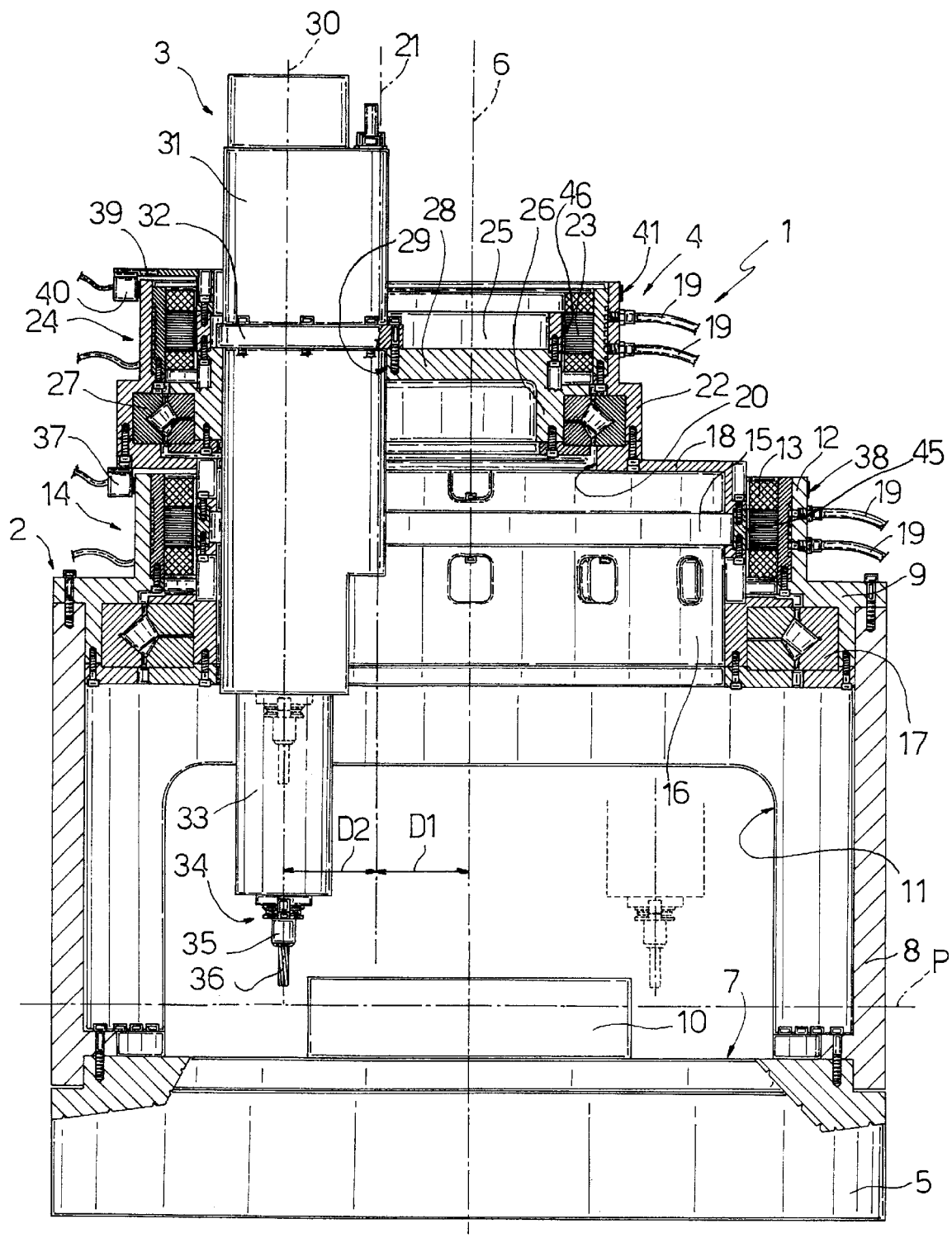
FIG. 1 shows a schematic front view, with parts removed for clarity, of a machine tool in accordance with the teachings of the present invention.
Figure 2:
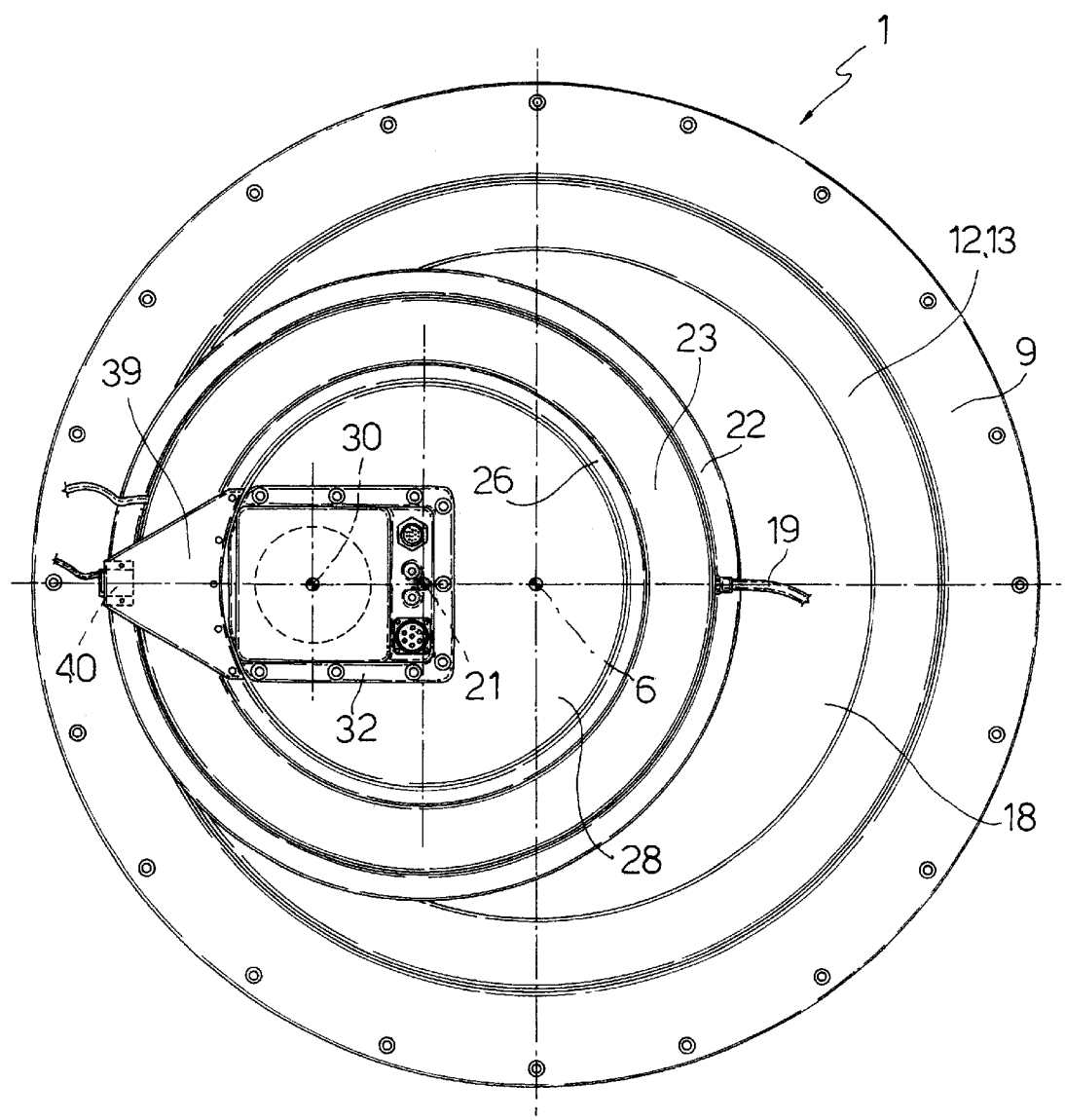
FIG. 2 shows a top plan view of the FIG. 1 machine tool.

Number 1 in FIG. 1 indicates as a whole a machine tool comprising a frame 2 supporting a machining unit 3 of the type described, for example, in the present Applicant's U.S. Pat. No. 5,350,263, in which a machining unit is disclosed comprising a straight guide and a powered slide, that is angularly fixed in relation to the guide, supports a toolhead provided with a machining tool and is movable long the guide to move the tool in a direction parallel to the guide.

In FIG. 1, frame 2 supports unit 3 by means of an actuating device 4 for moving unit 3, with respect to frame 2, parallel to a reference plane P, which, in the example shown, is horizontal, but which, in other embodiments not shown, may be other than horizontal.

Frame 2 is a fixed frame comprising a cylindrical bed 5, which has a longitudinal main axis 6 perpendicular to plane P and supports, at a top surface 7 parallel to plane P, a tubular body 8, a first end of which is connected integrally to bed 5 along an outer periphery of surface 7, and a second end of which is fitted integrally with an inner flange defined by an annular plate 9 coaxial with main axis 6. Frame 2 supports a work table 10, which is located on surface 7 of bed 5, inside tubular body 8, and is accessible from the outside through two diametrical openings 11 (only one shown) formed in tubular body 8.

At its inner periphery, annular plate 9 supports a further tubular body 12, which is coaxial with main axis 6, and an inner lateral surface of which is fitted integrally with a main stator 13 of a known main electric torque motor 14 coaxial with main axis 6. In addition to main stator 13, main torque motor 14 also comprises a main rotor 15 having a cylindrical outer lateral surface 45 and defining an intermediate portion of a further tubular body 16 coaxial with main axis 6. Tubular body 16 is supported, at one end housed inside tubular body 8, by tubular body 8 itself via the interposition of a crossed-tapered-roller bearing 17 coaxial with main axis 6, and is closed at the other end by a flat circular plate 18 parallel to plane P. Tubular body 12 supports a known hydraulic device 19 for cooling main stator 13.

Plate 18 has an eccentric through hole 20 coaxial with a secondary axis 21, which is parallel to main axis 6 and separated from main axis 6 by a first given distance D1 which is less than a radius of main rotor 15.

At hole 20, plate 18 supports a further tubular body 22 coaxial with axis 21, and an inner lateral surface of which is fitted integrally with a secondary stator 23 of a known secondary electric torque motor 24 coaxial with secondary axis 21 and comprising a secondary rotor 25, which has a cylindrical outer lateral surface 46 and defines an end portion of a further tubular body 26 coaxial with axis 21. The projection on plane P of the outer lateral surface 46 of secondary rotor 25 is within the projection on plane P of the outer lateral surface 45 of main rotor 15.

The end of tubular body 26 housed inside tubular body 22 is supported by tubular body 22 itself via the interposition of a crossed-tapered-roller bearing 27 coaxial with secondary axis 21.

Tubular body 26 is fitted with a flat intermediate plate 28 parallel to plane P and having an eccentric through opening 29, which is coaxial with an axis 30 parallel to main axis 6 and separated by a second given distance D2 from secondary axis 21. Unit 3 is fitted through opening 29, is of the known type disclosed in U.S. Pat. No. 5,350,263, and comprises a substantially parallelepiped-shaped casing defining a straight slideway 31 supported by plate 28 and connected to plate 28 at an outer intermediate flange 32; a powered cylindrical sleeve defining a powered slide 33 coaxial with, and movable axially along, axis 30 and angularly fixed relative to slideway 31; and a toolhead 34, which, in the example shown, is fixed with respect to slide 33 and comprises a spindle 35 for rotating a tool 36, coaxial with axis 30, about axis 30, but which, in variations not shown, is mounted to move, in a known manner and with respect to slide 33, about one or more separate rotary axes.

Tubular body 22 is fitted integrally with a feedback sensor 37, which is movable with main rotor 15 along a graduated scale 38 drawn on the outer surface of tubular body 12 to emit a signal indicating the angular position of main rotor 15 about main axis 6 and with respect to frame 2; and rotor 25 is fitted integrally, by means of a bracket 39, with a feedback sensor 40, which is movable with rotor 25 along a graduated scale 41 drawn on the outer surface of tubular body 22 to emit a signal indicating the angular position of rotor 25 about secondary axis 21 and with respect to tubular body 22.

In actual use, actuating device 4 moves unit 3 in plane P by combining rotation of the two rotors 15 and 25 about axes 6 and 21. Main rotor 15 rotates both unit 3 and secondary rotor 25 about main axis 6, and secondary rotor 25 in turn rotates unit 3 about secondary axis 21.

Axis 30 of unit 3 can be positioned by actuating device 4 at any point on an annular surface having, in absolute value, an outside radius of D2+D1, and an inside radius of D1−D2. When, as in the example embodiment described, second distance D2 equals first distance D1, said annular surface is a flat, substantially circular surface.

Powered slide 33 moves operating head 34 along axis 30 so as to locate tool 36 at any point of a cylindrical volume, the base of which is defined by the aforementioned annular surface, and the length of which is equal to the run of slide 33.

Machine tool 1 as described has the advantage of being smaller than known machines, on account of its overall cylindrical structure being much more compact than those of linear-axis machines. Moreover, any forces transmitted by unit 3 to motors 14 and 24 are discharged on frame 2 in the form of distributed tensile and compression stress which frame 2, being substantially cylindrical, can easily absorb without too much trouble. As a result, for a given rigidity, frame 2 may be much lighter than those of corresponding linear machines.

Machine tool 1 also has the further advantage of not requiring mechanical stops for the main and secondary motors, by the movements of 3 being achieved by a combination of circular movements.

Figure 3:
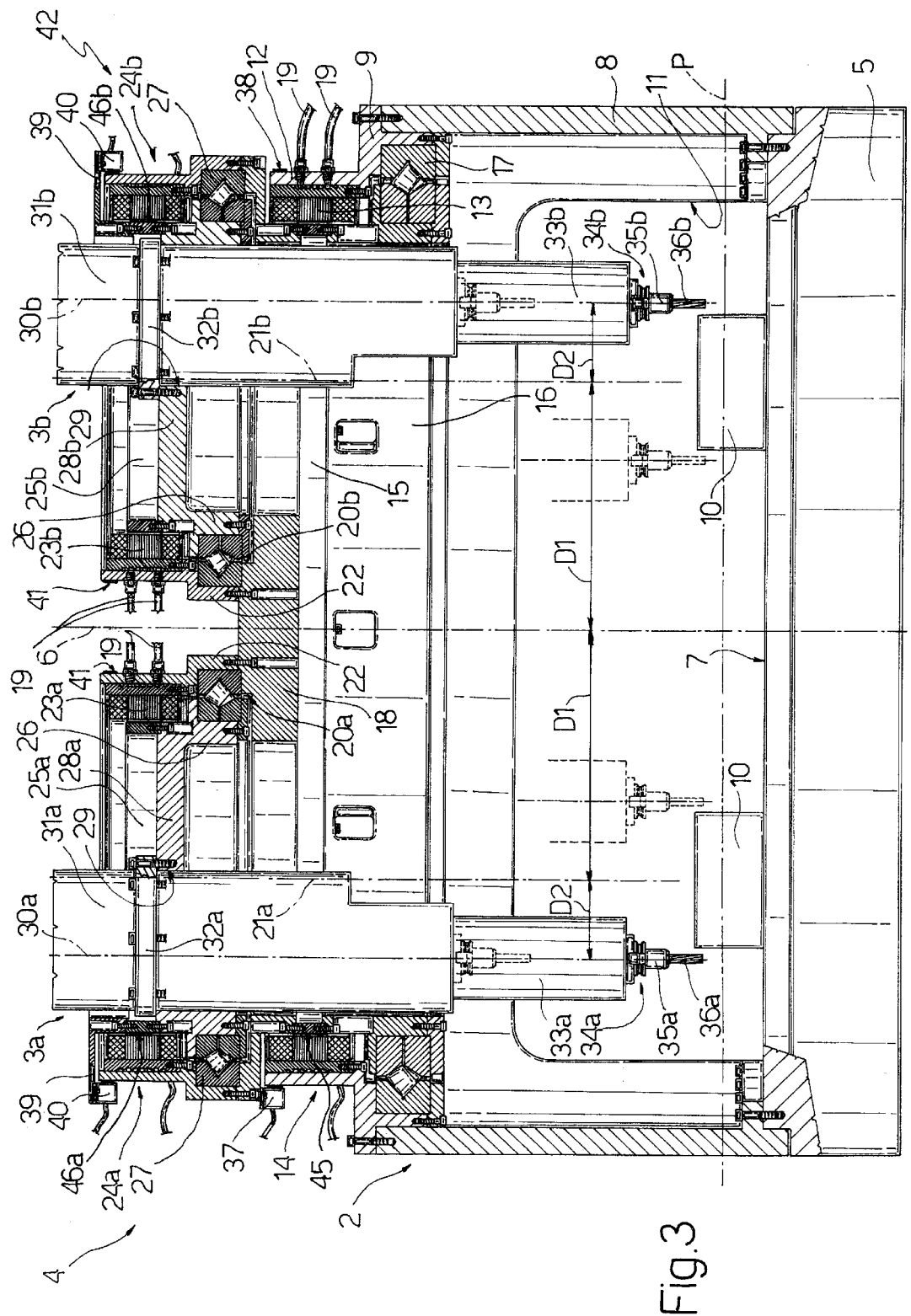
FIG. 3 shows a first variation of the FIG. 1 machine tool.

The FIG. 3 embodiment relates to a machine tool 42 similar to machine tool 1, and the component parts of which are indicated, wherever possible, using the same reference numbers as for corresponding parts of machine tool 1.

Machine tool 42 provides for simultaneously working two identical parts and/or for simplifying any tool-change operation with no downtime involved. For which purpose, machine tool 42 differs from machine tool 1 by plate 18 having two eccentric through holes 20a, 20b. Hole 20a is coaxial with a secondary axis 21a parallel to main axis 6 and separated from main axis 6 by a given distance D1; and hole 20b is coaxial with a secondary axis 21b parallel to main axis 6 and separated from main axis 6 by a given distance D1. More specifically, holes 20a, 20b are diametrically opposite and symmetrical with respect to main axis 6.

At hole 20a, plate 18 supports a secondary electric torque motor 24a, which comprises a secondary stator 23a and a secondary rotor 25a, both coaxial with secondary axis 21a. Secondary rotor 25a has a cylindrical outer lateral surface 46a, and is fitted integrally with an eccentric machining unit 3a coaxial with an axis 30a parallel to and separated by a distance D2 from secondary axis 21a.

Machining unit 3a is similar to machining unit 3 of machine tool 1, and comprises a substantially parallelepiped-shaped casing defining a straight slideway 31a supported by plate 28a and connected to plate 28a at an outer intermediate flange 32a; a powered cylindrical sleeve defining a powered slide 33a coaxial with and movable axially along, axis 30a and angularly fixed relative to slideway 31a and a toolhead 34a which, in the example shown, is fixed with respect to slide 33a and comprises a spindle 35a for rotating a tool 36a coaxial with axis 30a about axis 30a, but which, in variations not shown, is mounted to move, with respect to slide 33a, about two or more separate axes.

At hole 20b, plate 18 supports a secondary torque motor 24b, which comprises a secondary stator 23b and a secondary rotor 25b, both coaxial with secondary axis 21b. Secondary rotor 25b has a cylindrical outer lateral surface 46b, and is fitted integrally with an eccentric machining unit 3b coaxial with an axis 30b parallel to and separated by a distance D2 from secondary axis 21b.

Machining unit 3b is similar to machining unit 3 of machine tool 1, and comprises a substantially parallelepiped-shaped casing defining a straight slideway 31b supported by plate 28b and connected to plate 28b at an outer intermediate flange 32b; a powered cylindrical sleeve defining a powered slide 33b coaxial with and movable axially along axis 30b and angularly fixed relative to slideway 31b; and a toolhead 34b, which, in the example shown, is fixed with respect to slide 33b and comprises a spindle 35b for rotating a tool 36b, coaxial with axis 30b, about axis 30b, but which, in variations not shown, is mounted to move, with respect to slide 33b, about two or more separate axes. The projection on plane P of each of outer lateral surfaces 46a and 46b is within the projection on plane P of outer lateral surface 45 of main rotor 15.

Figure 4:
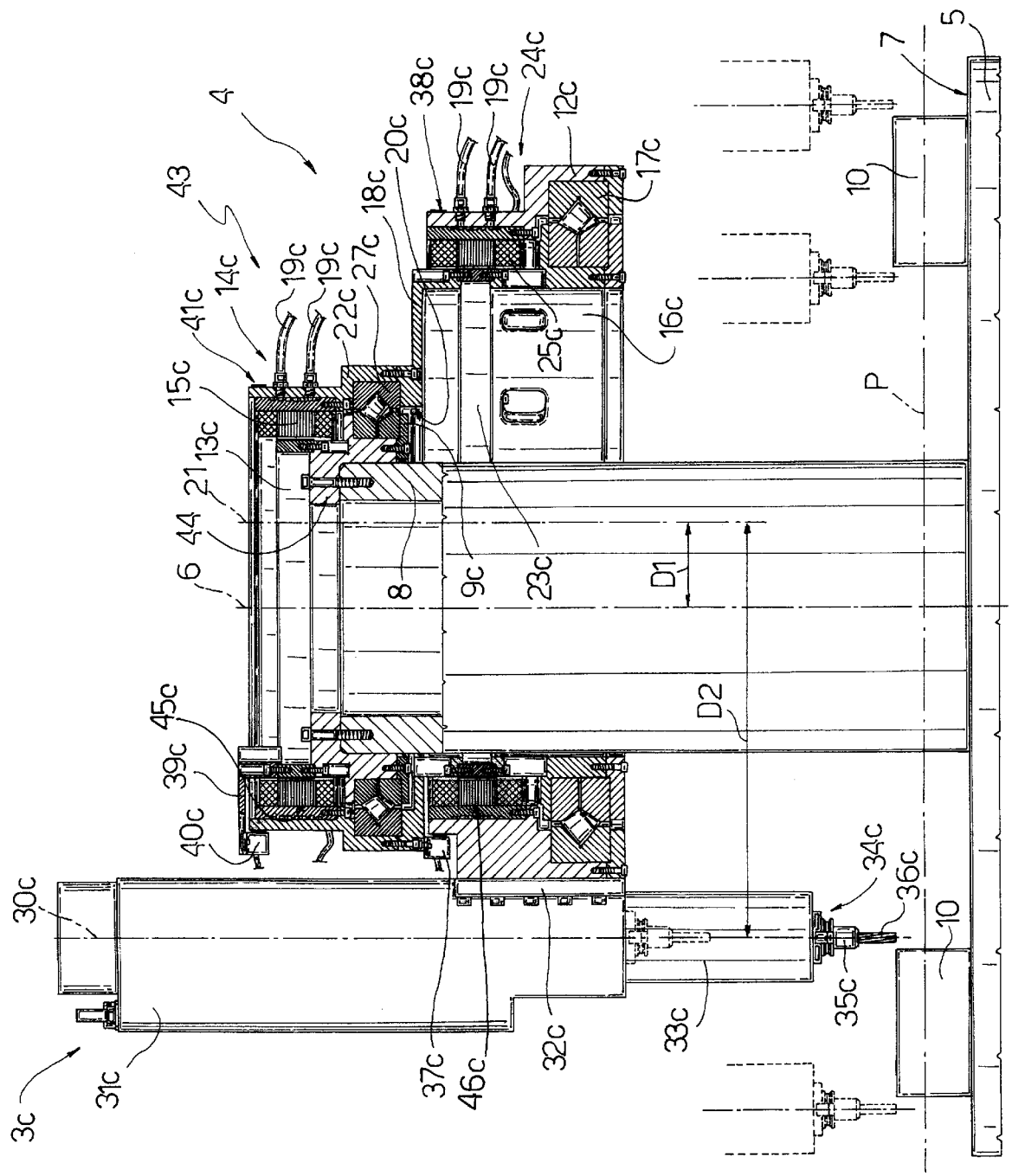
FIG. 4 shows a second variation of the FIG. 1 machine.

The FIG. 4 embodiment relates to a machine 43 similar to machine 1, and the component parts of which are indicated, wherever possible, using the same reference numbers as for corresponding parts of machine 1.

Machine 43 differs from machine 1 by the free end of tubular body 8 supporting a cup-shaped body 44 fitted onto tubular body 8 and comprising an annular end wall defined by an annular plate 9c, which is coaxial with main axis 6 and is fitted integrally with a main electric torque motor 14c. Main torque motor 14c comprises a main stator 13c coaxial with main axis 6 and integral with annular plate 9c, and a main rotor 15c also coaxial with main axis 6 and having a cylindrical outer lateral surface 45c. Main rotor 15c is integral with a tubular body 22c coaxial with main axis 6 and connected in rotary manner to cup-shaped body 44 via the interposition of a crossed-tapered-roller bearing 27c coaxial with main axis 6.

Tubular body 22c supports a known hydraulic device 19c for cooling main rotor 15c, and is fitted integrally at the bottom end with an annular plate 18c parallel to plane P and having an eccentric through hole 20c coaxial with main axis 6 and fitted through with tubular body 8.

The outer periphery of plate 18c is fitted integrally with a secondary electric torque motor 24c comprising a secondary stator 23c defining an intermediate portion of a further tubular body 16c coaxial with a secondary axis 21 parallel to and separated by a first given distance D1 from main axis 6. Secondary torque motor 24c comprises a secondary rotor 25c coaxial with secondary axis 21 and having a cylindrical outer lateral surface 46c. Secondary rotor 25c is integral with a tubular body 12c connected in rotary manner to tubular body 16c via the interposition of a crossed-tapered-roller bearing 17c coaxial with secondary axis 21; and tubular body 12c supports known hydraulic device 19c for cooling secondary rotor 25c.

The outer periphery of tubular body 12c is fitted with operating unit 3c, which is similar to operating unit 3 of machine 1 and comprises a substantially parallelepiped-shaped casing 31c connected to tubular body 12c at an outer intermediate longitudinal fastening plate 32c. Operating unit 3c also comprises a powered cylindrical sleeve 33c coaxial with and movable along an axis 30c parallel to main axis 6 and separated by a given distance D2 from secondary axis 21; and a toolhead 34c which, in the example shown, is fixed with respect to sleeve 33c and comprises a spindle 35c for rotating a tool 36c, coaxial with axis 30c, about axis 30c. In variations not shown, toolhead 34c is mounted to move, with respect to sleeve 33c, about two or more separate axes.

Tubular body 22c is fitted integrally with a feedback sensor 37c, which is movable with main rotor 15c along a graduated scale 38c drawn on the outer surface of tubular body 12c to emit a signal indicating the angular position of secondary rotor 25c about secondary axis 21 and with respect to frame 2; and main stator 13c is fitted integrally, by means of a bracket 39c, with a feedback sensor 40c, which faces a graduated scale 41c drawn on the outer surface of body 22c and movable with main rotor 15c to emit a signal indicating the angular position of main rotor 15c about main axis 6 and with respect to tubular body 22c.

The projection of outer lateral surface 45c of main rotor 15c on plane P is within the projection of outer lateral surface 46c of secondary rotor 25c on plane P.

In the claims:

1. A machine tool comprising:
   a fixed supporting frame;
   at least one toolhead fitted movably to said frame;
   a tool mounted on said toolhead and movable therewith;
   and an actuating device for moving said tool with respect to said frame and within a predetermined volume;
   said actuating device comprising a main electric motor in turn comprising a main stator integral with said frame, and a main rotor fitted to the main stator and rotating about a main axis with respect to the main stator;
   at least one secondary electric motor in turn comprising a secondary stator integral with said main rotor, and a secondary rotor fitted to the secondary stator and rotating about a secondary axis movable with said main rotor;
   and at least a machining unit comprising straight guide means supported eccentrically by said secondary rotor, and powered slide means angularly fixed in relation to said straight guide means and movable therealong in a direction parallel to said main axis and said secondary axis; said toolhead being mounted on said powered slide means; said tool being mounted on said toolhead for rotation in relation thereto about a tertiary axis parallel to said main axis and said secondary axis; and each said axis being separated from each of the other axes by distances, each of which is less than a radius of the main rotor.

2. A machine tool as claimed in claim 1, wherein said main rotor supports two said secondary motors, each having a respective secondary axis parallel to said main axis; each said secondary motor comprising a relative said secondary stator integral with said main rotor, and a relative said secondary rotor fitted in rotary manner to the relative said secondary stator; and each said secondary rotor supporting a respective said machining unit comprising respective straight guide means supported eccentrically by the respective said secondary rotor, and a respective said powered slide means angularly fixed in relation to the respective said straight guide means and movable therealong in a direction parallel to said main axis and said secondary axis; each said powered slide means supporting a respective said operating heat which is rotary in relation to the relative powered slide means about a tertiary axis parallel to said main axis and said secondary axis, and each said axis being separated from each of the other axes by distances, each of which is less than a radius of the main rotor.

3. A machine tool as claimed in claim 1, wherein said two secondary axes are symmetrical with respect to said main axis.

4. A machine tool as claimed in claim 1, wherein said straight guide means extend through both said main rotor and said secondary rotor.

5. A machine tool as claimed in claim 1, wherein said powered slide means extending through both said main rotor and said secondary rotor.

6. A machine tool as claimed in claim 1, wherein said main electric motor and said secondary motor are electric torque motors.

7. A machine tool as claimed in claim 1, wherein said frame is a substantially cylindrical frame.

8. A machine comprising:

a supporting frame;

an operating unit fitted movably to said frame; and an actuating device for moving said operating unit with respect to said frame and parallel to a given plane;

characterized in that said actuating device comprises a main electric motor in turn comprising a main stator integral with said frame, and a main rotor fitted to the main stator and rotating about a main axis with respect to the main stator;

and at least one secondary electric motor in turn comprising a secondary stator integral with said main rotor, and a secondary rotor fitted to the secondary stator and rotating about a secondary axis movable with said main rotor;

said main axis and said secondary axis being perpendicular to said plane, and being separated from each other by a first given distance; said operating unit being supported eccentrically by said secondary rotor; and said first distance being less than a radius of the main rotor;

wherein said main rotor supports two said secondary motors, each having a respective secondary axis perpendicular to said plane and eccentric with respect to said main axis; each said secondary motor comprising a relative said secondary stator integral with said main rotor, and a relative said secondary rotor fitted in rotary manner to the relative said secondary stator; and each said secondary rotor supporting eccentrically a respective said operating machining unit.

9. A machine as claimed in claim 8, wherein said two secondary axes are symmetrical with respect to said main axis.

10. A machine as claimed in claim 8, wherein each said operating unit extends through the relative said secondary rotor.

* * * * *